United States Patent
Okaya et al.

(10) Patent No.: US 7,817,513 B2
(45) Date of Patent: Oct. 19, 2010

(54) RECORD AND REPRODUCTION APPARATUS FOR READING OR WRITING DATA DURING REPRODUCING OF STREAM DATA

(75) Inventors: Yoshihisa Okaya, Kyoto (JP); Tsuyoshi Sato, Kyoto (JP); Mitsuya Nakahara, Osaka (JP); Kenichiro Uda, Osaka (JP)

(73) Assignee: Panasonic Corporation, Osaka (JP)

( * ) Notice: Subject to any disclaimer, the term of this patent is extended or adjusted under 35 U.S.C. 154(b) by 546 days.

(21) Appl. No.: 11/892,333

(22) Filed: Aug. 22, 2007

(65) Prior Publication Data

US 2008/0049575 A1 Feb. 28, 2008

(30) Foreign Application Priority Data

Aug. 24, 2006 (JP) ............................. 2006-227698

(51) Int. Cl.
   *G11B 15/52* (2006.01)
(52) U.S. Cl. ................................ 369/47.32; 369/53.34
(58) Field of Classification Search ............... 369/47.33
   See application file for complete search history.

(56) References Cited

U.S. PATENT DOCUMENTS

| | | | | |
|---|---|---|---|---|
| 5,363,361 A | * | 11/1994 | Bakx | 369/47.33 |
| 5,517,477 A | * | 5/1996 | Sako | 369/53.18 |
| 5,608,697 A | * | 3/1997 | De Haan et al. | 369/47.33 |
| 5,768,236 A | | 6/1998 | Kihara | |
| 5,914,941 A | | 6/1999 | Janky | |
| 7,190,654 B2 | * | 3/2007 | Wu et al. | 369/84 |
| 2001/0026514 A1 | * | 10/2001 | Izawa | 369/47.33 |
| 2004/0165486 A1 | * | 8/2004 | Ueki | 369/30.23 |
| 2004/0202073 A1 | | 10/2004 | Lai et al. | |
| 2005/0162990 A1 | * | 7/2005 | Murata | 369/30.23 |
| 2006/0146660 A1 | | 7/2006 | Ikeda et al. | |

FOREIGN PATENT DOCUMENTS

JP 11-126427 5/1999

* cited by examiner

*Primary Examiner*—Paul Huber
(74) *Attorney, Agent, or Firm*—McDermott Will & Emery LLP

(57) ABSTRACT

A record and reproduction apparatus includes: a CPU; a memory; a recording medium control unit configured to read out data from a recording medium; a reproduction buffer configured to temporarily store stream data such as an image and an audio out of the data read by the recording medium control unit; a reproduction processing unit configured to decode and reproduce the stream data temporarily stored in the reproduction buffer; and an access control unit configured to control the timing by which the access control unit switches between access to the memory and access to the reproduction buffer so that the reproduction processing does not break off during reproduction of the stream data while supervising the state of the reproduction buffer, and to manage the memory and the recording medium control unit in each transaction.

20 Claims, 12 Drawing Sheets

RECORD AND REPRODUCTION APPARATUS FOR READING OR WRITING DATA DURING REPRODUCING OF STREAM DATA

FIELD OF THE INVENTION

The present invention relates to a record and reproduction apparatus. In particular, the present invention relates to a technique for reading or writing arbitrary data from/to a recording medium during reproducing stream data recorded on the same recording medium or recording stream data on the same recording medium.

BACKGROUND OF THE INVENTION

Among conventional record and reproduction apparatuses for a recording medium such as an optical disc, a record and reproduction apparatus which can easily perform simultaneous record or simultaneous reproduction of two or more independent pieces of information or can easily process record and reproduction simultaneously by having two or more buffers for temporary memory is known (for example, refer to Japanese Patent Application Laid-Open No. H11-126427 (Pages 3 to 5 and FIGS. 1 to 2)).

In a conventional record and reproduction apparatus, the read processing or the write processing of arbitrary data cannot be performed to a recording medium during recording or reproducing. Alternatively, when making forcible access in pursuit of a large amount of read processing or write processing, a load may be imposed on record processing or reproduction processing, and a drop frame of an image, a sound skip, and a record leakage may occur. Moreover, if a priority is given to record processing or reproduction processing, read processing or write processing may take much time. It is, therefore, necessary to prepare a mass-storage buffer to reduce processing load.

SUMMARY OF THE INVENTION

Therefore, the main aim of the present invention is to enable reading and writing the arbitrary data from/to a recording medium during reproducing stream data recorded on the same recording medium or recording stream data on the same recording medium, and to enable a buffer capacity for recording or reproducing to be held down.

(1) A record and reproduction apparatus according to the present invention includes: a CPU; a memory; a recording medium control unit configured to read out data from a recording medium; a reproduction buffer configured to temporarily store stream data such as an image and an audio out of the data read by the recording medium control unit; a reproduction processing unit configured to decode and reproduce the stream data temporarily stored in the reproduction buffer; and an access control unit configured to control the timing by which the access control unit switches between access to the memory and access to the reproduction buffer so that the reproduction processing does not break off during reproduction of the stream data while supervising the state of the reproduction buffer, and to manage the memory and the recording medium control unit in each transaction. This mode corresponds to [P-r] mode of "reproducing the stream (P) and reading out the medium (r)."

Being configured as such, the record and reproduction apparatus can read arbitrary data from the recording medium and store the read arbitrary data in the memory without causing the break of the reproduction processing during reproducing the stream data while holding down the buffer capacity and the medium access speed.

(2) In the record and reproduction apparatus of the above-mentioned configuration, the recording medium control unit controls a read only media such as a CD-ROM and a DVD-ROM as the recording medium. In this case, measures that specializes in read only media can be performed.

(3) Moreover, in the record and reproduction apparatus of the above-mentioned configuration, the recording medium control unit comprises means for recording data in the recording medium. This mode corresponds to [P-w] mode of "reproducing the stream (P) and writing into the medium (w)."

This configuration makes it possible to write the arbitrary data stored in the memory into the recording medium without causing the break of the reproduction processing during reproducing the stream data while holding down the buffer capacity and the medium access speed.

(4) Moreover, a record and reproduction apparatus according to the present invention includes: a CPU; a memory; a recording medium control unit configured to record data on a recording medium; a record processing unit configured to receive and encode a signal such as an image and an audio; a recording buffer configured to temporarily store the stream data encoded by the record processing unit; and an access control unit configured to control the timing by which the access control unit switches between access to the memory and access to the recording buffer so that the record processing does not break off during recording the stream data on the recording medium while supervising the state of the recording buffer, and to manage the memory and the recording medium control unit in each transaction. This mode corresponds to [R-w] mode of "recording the stream (R) and writing in the medium (w)."

This configuration makes it possible to write the arbitrary data stored in the memory into the recording medium without causing the break of the recording processing during recording the stream data while holding down the buffer capacity and the medium access speed.

(5) In the record and reproduction apparatus in which the above-mentioned record processing unit is referred to, the recording medium control unit comprises means for reading out data from the recording medium. This mode corresponds to [R-r] mode of "recording the stream (R) and reading out the medium (r)."

This configuration makes it possible to read the arbitrary data from the recording medium and store the read arbitrary data in the memory without causing the break of the recording processing during recording the stream data while holding down the buffer capacity and the medium access speed.

(6) Moreover, in the record and reproduction apparatus in which the above-mentioned means for reading out data from the recording medium is referred to, a reproduction buffer configured to temporarily store stream data such as an image and an audio out of the data read by the recording medium control unit, and a reproduction processing unit configured to decode and reproduce the stream data temporarily stored in the reproduction buffer are included. This mode corresponds to having [P-r] mode of "reproducing the stream (P) and reading out the medium (r)" and [P-w] mode of "reproducing the stream (P) and writing into the medium (w)", in addition to [R-r] mode of "recording the stream (R) and reading out the medium (r)" and [R-w] mode of "recording the stream (R) and writing into the medium (w)."

This configuration makes it possible to write arbitrary data stored in the memory into the recording medium and store the arbitrary data recorded in the recording medium into the memory without causing the break of the recording processing or the reproduction processing during recording or reproducing the stream data while holding down the buffer capacity and the medium access speed.

(7) Moreover, in the record and reproduction apparatus of the above-mentioned configuration, the recording medium control unit controls a flash memory as the recording medium. In this case, measures that specializes in a flash memory and memory card, etc. having high general versatility as a recording medium can be performed.

(8) Moreover, in one of the above-mentioned record and reproduction apparatuses, the access control unit is installed inside the CPU. In this case, a simplified system configuration of the record and reproduction apparatus can be easily achieved.

(9) A companion system according to the present invention includes one of the above-mentioned record and reproduction apparatuses, and further includes at least an interface to a host system that controls mobile communication functions. In the companion system, the access control unit in the record and reproduction apparatus is configured to manage a memory access authority regarding the memory as a shared memory with the host system.

Under a configuration like this, the function which reads or writes arbitrary data from/to the same recording medium can be easily incorporated into the mobile communication apparatus. At this time, the capacity of the recording or reproduction buffer and the medium access speed are held down, and the break of the reproduction processing and the record processing is not caused during reproducing the stream data recorded on recording medium or recording the stream data on the record medium.

(10) Moreover, a companion system according to the present invention includes one of the above-mentioned record and reproduction apparatuses, and further includes at least an interface to a host system that controls a vehicle-mounted navigation system. In the companion system, the access control unit in the record and reproduction apparatus is configured to manage a memory access authority regarding the memory as a shared memory with the host system.

Under a configuration, the function which reads or writes arbitrary data from/to the same recording medium can be easily incorporated into the vehicle-mounted navigation system. At this time, the capacity of the recording or reproduction buffer and the medium access speed are held down, and the break of the reproduction processing and the record processing is not caused during reproducing the stream data recorded on the recording medium or recording the stream data on the record medium.

BRIEF DESCRIPTION OF THE DRAWINGS

The present invention is illustrated be way of example and not limitation in the figures of the accompanying drawings, in which like references indicate similar elements and in which.

DETAILED DESCRIPTION OF THE INVENTION

Hereafter, the preferred embodiments of a record and reproduction apparatus and a companion system are explained referring to the drawings. Since the component(s) to which the same reference numeral is given in the preferred embodiments performs similar operation, explanation thereof might be omitted.

First Preferable Embodiment

Figure 1:
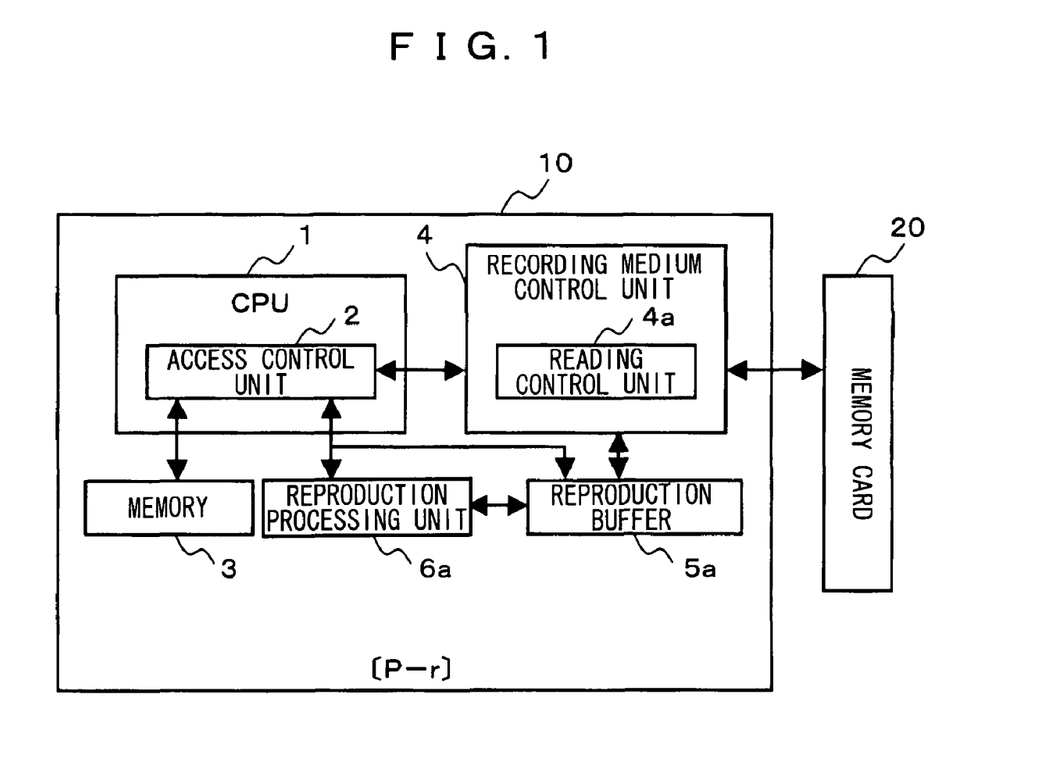
FIG. 1 is a block diagram showing a configuration of a record and reproduction apparatus in a first preferred embodiment of the present invention.

FIG. 1 is a block diagram showing a configuration of a record and reproduction apparatus in the first preferred embodiment of the present invention. This record and reproduction apparatus 10 includes a CPU 1, a memory 3, a recording medium control unit 4, a reproduction buffer 5a, a reproduction processing unit 6a, and an access control unit 2 in the CPU 1.

The recording medium control unit 4 includes a reading control unit 4a that reads out data from a memory card 20 that is a recording medium.

The reproduction buffer 5a stores stream data such as an image and an audio temporarily.

The reproduction processing unit 6a decodes and reproduces the stream data stored in the reproduction buffer 5a.

The access control unit 2 controls the timing by which the access control unit 2 switches between access to the reproduction buffer 5a and access to the memory 3 on the conditions that the reproduction processing does not break off while supervising the state of the reproduction buffer 5a during reproduction of the stream data. Moreover, the access control unit 2 manages the memory 3 and the recording medium control unit 4 in each transaction.

Figure 2:
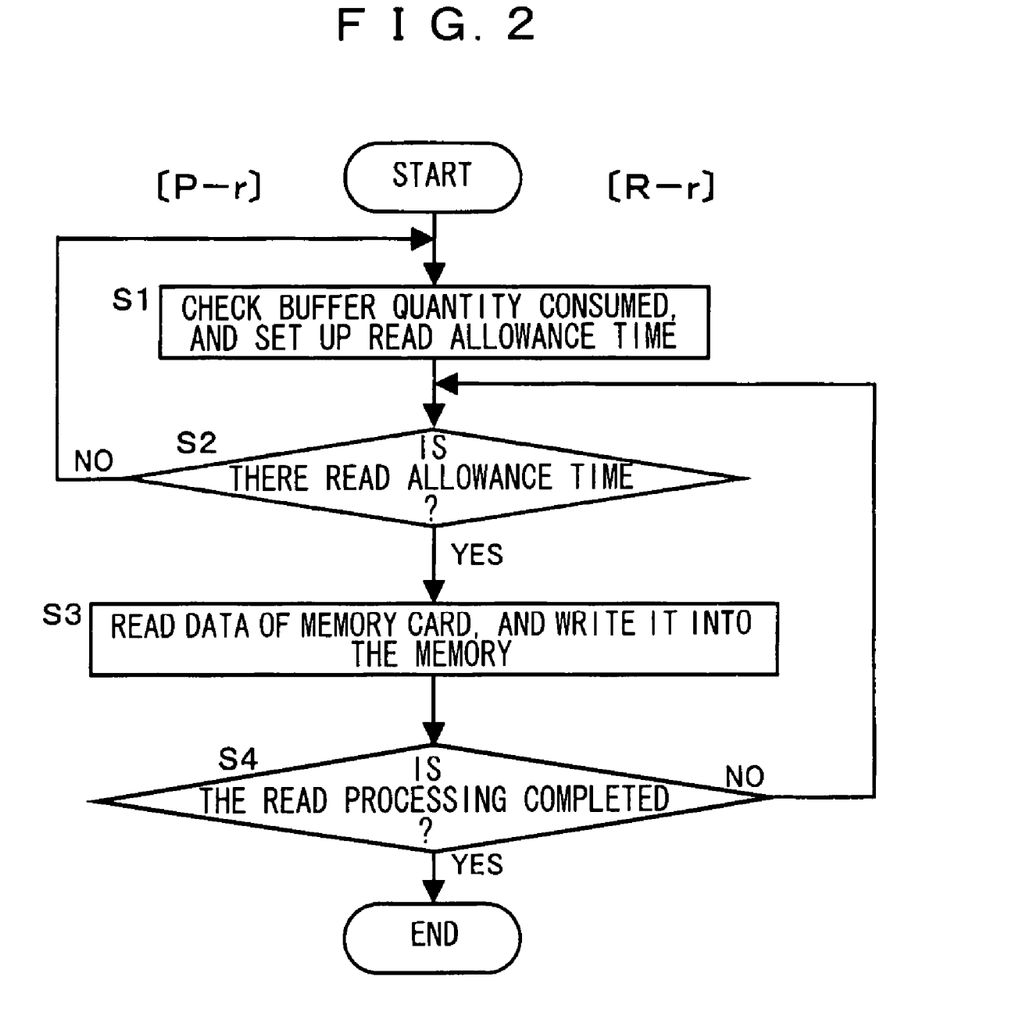
FIG. 2 is a flow chart showing an operation of a record and reproduction apparatus in the first, fourth, and fifth preferred embodiments of the present invention.

Next, operation of the record and reproduction apparatus 10 of this embodiment configured as stated above is explained according to the flow chart of FIG. 2. The operation of this embodiment is [P-r] mode, a combination of mode (P) which reproduces stream data stored in the memory card 20, and mode (r) which writes arbitrary data of the memory card 20 into the memory 3.

First of all, the access control unit 2 in the CPU 1 calculates a read allowance time during which it is guaranteed that the reproduction processing does not break off in the middle of operating the reproduction buffer 5a and the reproduction processing unit 6a to reproduce the stream data stored in the memory card 20. The read allowance time is calculated on the basis of the usage status of the reproduction buffer 5a, a reading time from the memory card 20 to the recording medium control unit 4, and a required time for storage in the reproduction buffer 5a, and a decoding time by the reproduction processing unit 6a, etc. (Step S1). Next, the reading control unit 4a in the recording medium control unit 4 reads the arbitrary data stored in the memory card 20 in the set read allowance time, and the CPU 1 writes desired data into the memory 3 (Step S3).

Here, when the read processing is not completed in the read allowance time, the access control unit 2 discontinues the read processing once and sets up the read allowance time again, and this processing is repeated until the read processing is completed (Step S4 and S2).

As mentioned above, according to this embodiment, the arbitrary data can be read from the memory card 20, without causing the break of the reproducing processing during reproduction of the stream data in the same memory card 20, while holding down the capacity of reproduction buffer 5a and the access speed to the memory card 20.

Second Preferable Embodiment

Figure 3:
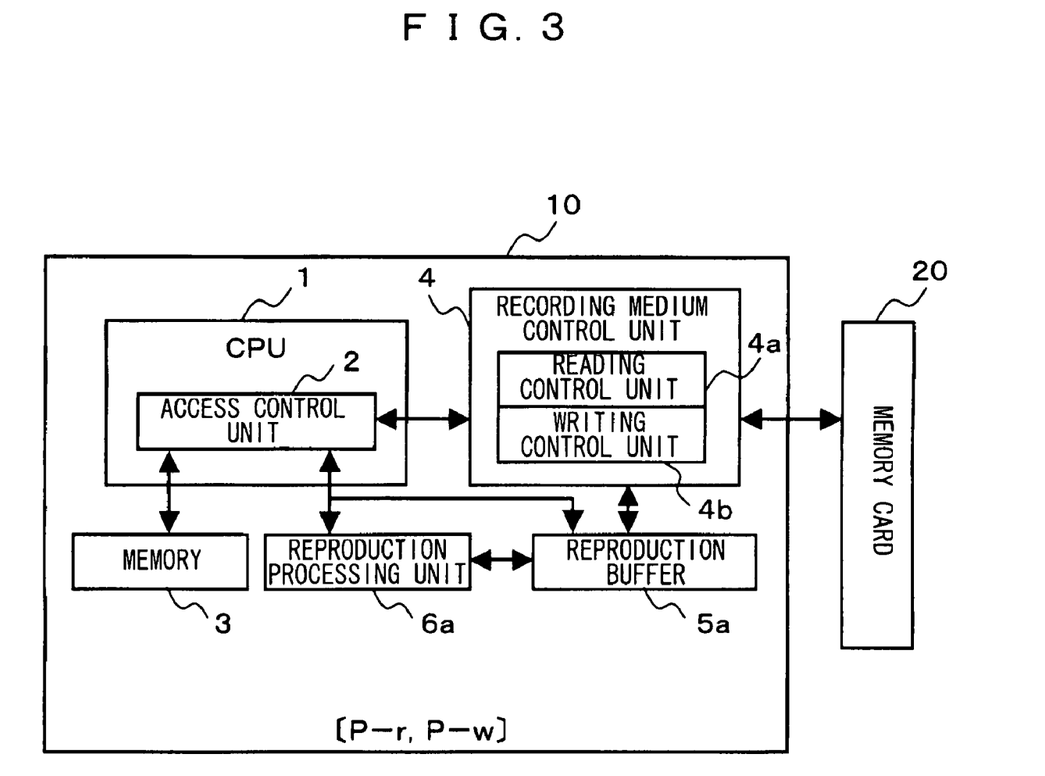
FIG. 3 is a block diagram showing a configuration of a record and reproduction apparatus in a second preferred embodiment of the present invention.

FIG. 3 is a block diagram showing a configuration of a record and reproduction apparatus in a second preferred embodiment of the present invention. The recording medium control unit 4 further includes a writing control unit 4b for recording data on the memory card 20 on the assumption that the configuration of the first preferred embodiment shown in FIG. 1 is adopted. Since other composition is the same as that of FIG. 1, the same reference numeral is given to the same part, and explanation thereof is omitted.

Figure 4:
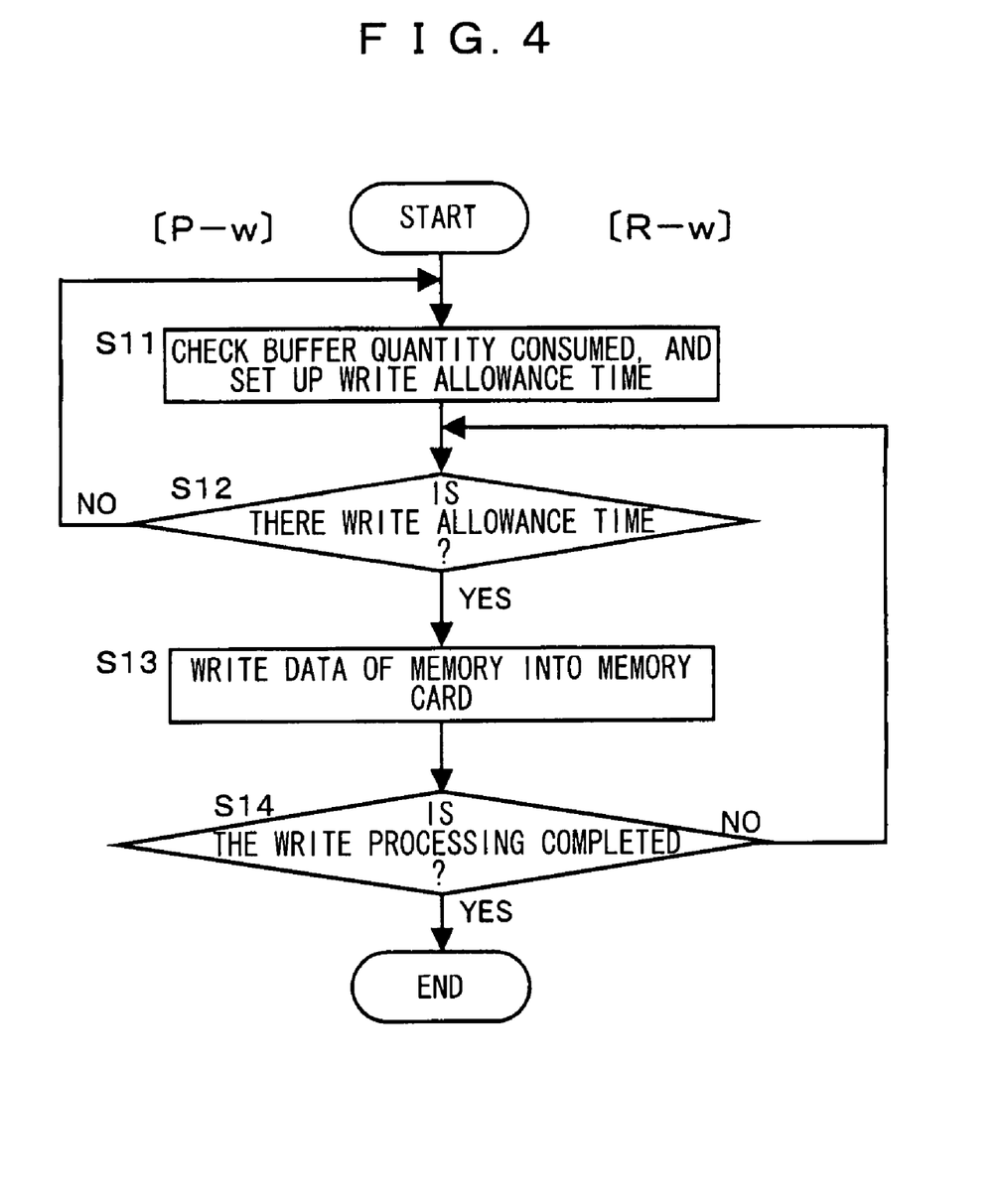
FIG. 4 is a flow chart showing an operation of a record and reproduction apparatus in the second, third, fourth, and fifth preferred embodiments of the present invention.

Next, operation of the record and reproduction apparatus 10 of this embodiment configured as stated above is explained according to a flow chart of FIG. 4. The operation of this embodiment is [P-r-w] mode, a combination of mode (P) which reproduces stream data stored in the memory card 20, mode (r) which writes arbitrary data of the memory card 20 into the memory 3, and mode (w) which writes arbitrary data of the memory 3 into the memory card 20.

First of all, the access control unit 2 in the CPU 1 calculates a write allowance time during which it is guaranteed that the record processing does not break off in the middle of operating the reproduction buffer 5a and the reproduction processing unit 6a to reproduce the stream data stored in the memory card 20. The write allowance time is calculated on the basis of the usage status of the reproduction buffer 5a, a reading time from the memory card 20 to the recording medium control unit 4, and a required time for storage in the reproduction buffer 5a, a decoding time by the reproduction processing unit 6a, etc. (Step S11). Next, the recording medium control unit 4 writes the arbitrary data of the memory 3 into the memory card 20 in the set write allowance time (Step S13).

Here, when the write processing is not completed in the read allowance time, the access control unit 2 discontinues the write processing once and sets up the write allowance time again, and this processing is repeated until the write processing is completed (Step S14 and S12).

About the processing ([P-r] mode) that reads the arbitrary data from the memory card 20 while reproducing the stream data stored in the same memory card 20 in the record and reproduction apparatus 10, the explanation is omitted since the explanation is similar to that of the flow chart of FIG. 2 in the first preferred embodiment.

As mentioned above, according to this embodiment, the arbitrary data can be read from the memory card 20, without causing the break of the reproducing processing during reproduction of the stream data stored in the same memory card 20, while holding down the capacity of the reproduction buffer 5a and the access speed to the memory card 20, and the arbitrary data further can be written on the same memory card 20 ([P-r and P-w]).

Third Preferable Embodiment

Figure 5:
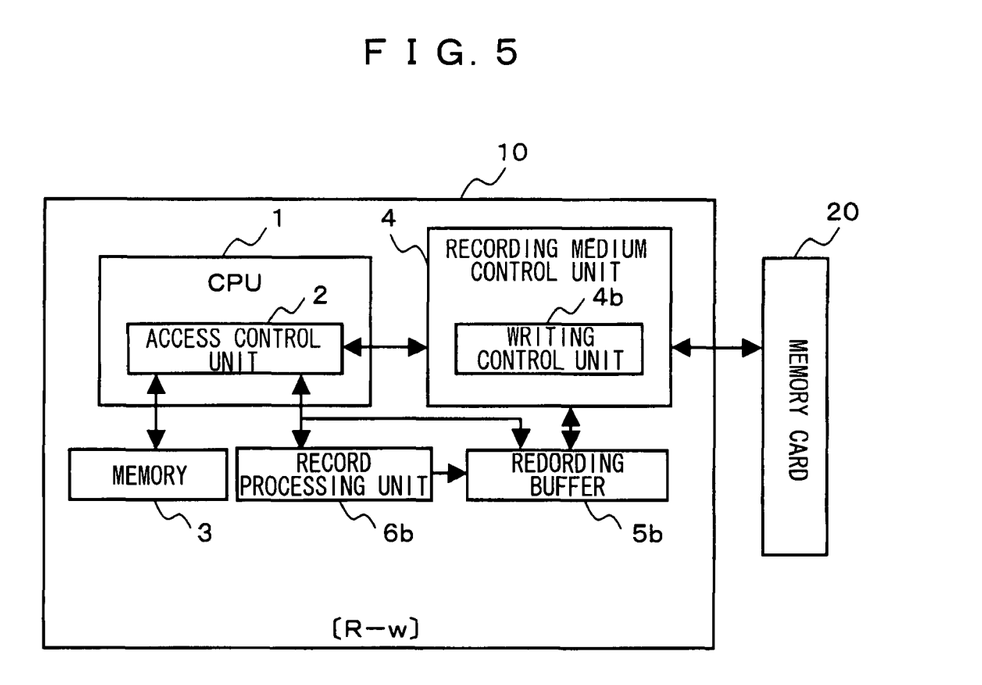
FIG. 5 is a block diagram showing a configuration of a record and reproduction apparatus in a third preferred embodiment of the present invention.

FIG. 5 is a block diagram showing a configuration of a record and reproduction apparatus in a third preferred embodiment of the present invention. This record and reproduction apparatus 10 includes a CPU 1, a memory 3, a recording medium control unit 4, a recording buffer 5b, a record processing unit 6b, and an access control unit 2 in the CPU 1.

The recording medium control unit 4 includes a writing control unit 4b for recording data on the memory card 20.

The record processing unit 6b receives and encodes a signal of an image and an audio etc.

The recording buffer 5b stores the encoded stream data temporarily.

The access control unit 2 controls the timing by which the access control unit 2 switches between access to the recording buffer 5b and access to the memory 3 on the conditions that the record processing does not break off, while supervising the state of the recording buffer 5b during record of the stream data. Moreover, the access control unit 2 manages the memory 3 and the recording medium control unit 4 in each transaction.

Next, operation of the record and reproduction apparatus 10 of this embodiment configured as stated above is explained according to the flow chart of FIG. 4. The operation of this embodiment is [R-w] mode, a combination of mode (R) which records stream data on the memory card 20, and mode (w) which writes the arbitrary data of the memory 3 into the memory card 20.

First of all, the access control unit 2 in the CPU 1 calculates a write allowance time during which it is guaranteed that the record processing does not break off in the middle of operating the recording buffer 5b and the record processing unit 6b to record the stream data on the memory card 20. The write allowance time is calculated on the basis of the usage status of the recording buffer 5b, a record time from the recording medium control unit 4 to the memory card 20, a required time for storage in the recording buffer 5b, and an encode time by the record processing unit 6b, etc. (Step S11). Next, the recording medium control unit 4 writes the arbitrary data into the memory card 20 in the set write allowance time (Step S13).

Here, when the write processing is not completed in the read allowance time, the access control unit 2 discontinues the write processing once and sets up the write allowance time again, and this processing is repeated until the write processing is completed (Step S14 and S12).

As mentioned above, according to this embodiment, the arbitrary data can be written to the memory card 20, without causing the break of the recording processing during record of the stream data on the same memory card 20, while holding down the capacity of recording buffer 5b and the access speed to the memory card 20.

Fourth Preferable Embodiment

Figure 6:
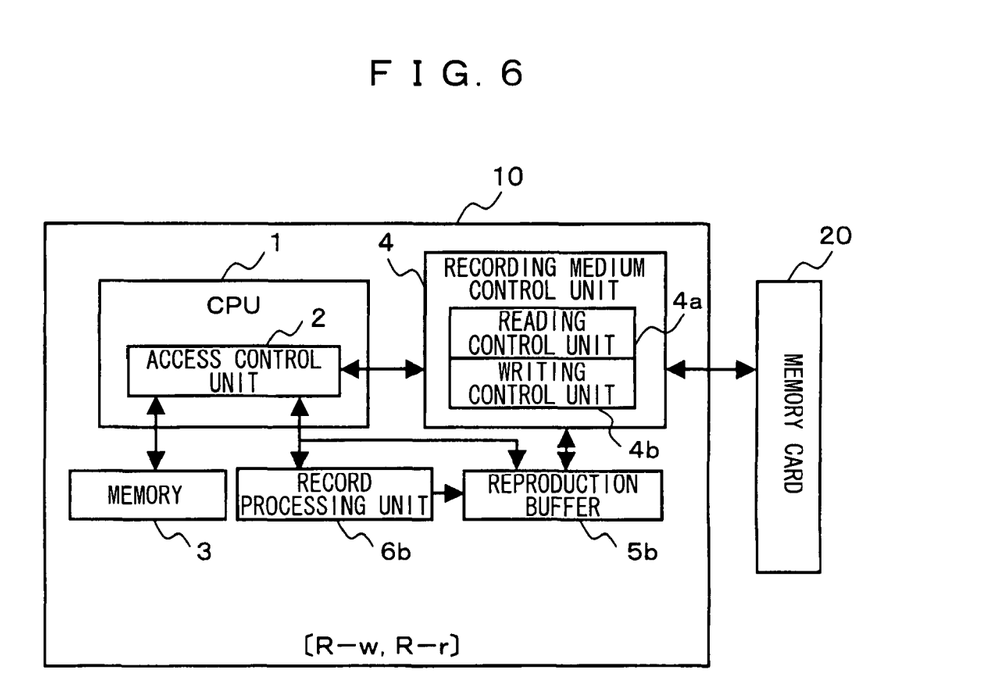
FIG. 6 is a block diagram showing a configuration of a record and reproduction apparatus in a fourth preferred embodiment of the present invention.

FIG. 6 is a block diagram showing a configuration of a record and reproduction apparatus in a fourth preferred embodiment of the present invention. The recording medium control unit 4 further includes a reading control unit 4a for reading out data from the memory card 20 on the assumption that the configuration of the third preferred embodiment shown in FIG. 5 is adopted. Since other composition is the same as that of FIG. 5, the same reference numeral is given to the same part, and explanation thereof is omitted.

Next, operation of the record and reproduction apparatus 10 of this embodiment configured as stated above is explained according to the flow chart of FIG. 2. The operation of this embodiment is [R-w-r] mode, a combination of mode (R) which records the stream data on the memory card 20, mode (w) which writes arbitrary data of the memory 3 into the memory card 20, and mode (r) which writes the arbitrary data of the memory card 20 into the memory 3.

First of all, the access control unit 2 in the CPU 1 calculates a read allowance time during which it is guaranteed that the reproduction processing does not break off in the middle of operating the recording buffer 5b and the record processing unit 6b to record the stream data on the memory card 20. The read allowance time is calculated on the basis of the usage status of the recording buffer 5b, a record time from the recording medium control unit 4 to the memory card 20, a required time for storage in the recording buffer 5b, and an encode time by the record processing unit 6b, etc. (Step S1). Next, the reading control unit 4a in the recording medium control unit 4 reads the arbitrary data stored in the memory card 20 in the set read allowance time, and the CPU 1 writes desired data into the memory 3 (Step S3).

Here, when the read processing is not completed in the read allowance time, the access control unit 2 discontinues the read processing once and sets up the read allowance time again, and this processing is repeated until the read processing is completed (Step S4 and S2).

About the processing ([R-w] mode) that writes the arbitrary data in the memory card 20 while recording stream data on the same memory card 20 in the record and reproduction apparatus 10, the explanation is omitted since the explanation is similar to that of the flow chart of FIG. 4 in the third preferred embodiment.

As mentioned above, according to this embodiment, the arbitrary data can be read from the memory card 20, without causing the break of the recording processing during record of the stream data on the same memory card 20, while holding down the capacity of the recording buffer 5b and the access speed to the memory card 20, and the arbitrary data further can be written into the same memory card 20 ([R-w and R-r]).

Fifth Preferable Embodiment

Figure 7:
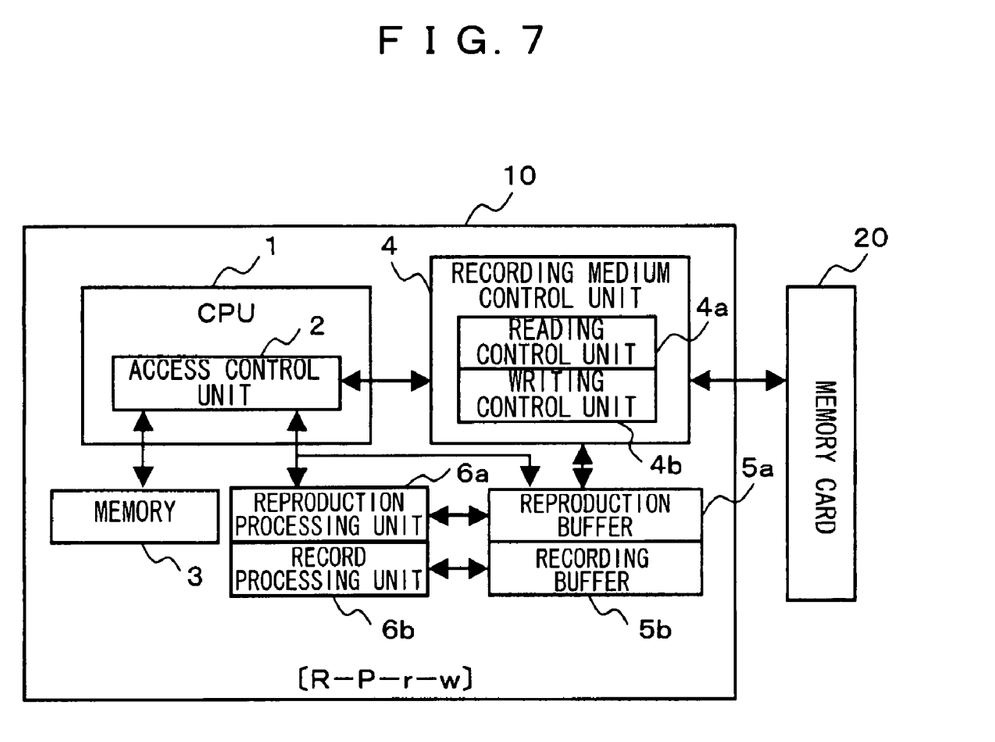
FIG. 7 is a block diagram showing a configuration of a record and reproduction apparatus in a fifth preferred embodiment of the present invention.

FIG. 7 is a block diagram showing a configuration of a record and reproduction apparatus in a fifth preferred embodiment of the present invention. The record and reproduction apparatus 10 includes a reproduction buffer 5a and a reproduction processing unit 6a on the assumption that the configuration of the fourth preferred embodiment shown in FIG. 6 is adopted. Since other composition is the same as that of FIG. 6, the same reference numeral is given to the same part, and explanation thereof is omitted.

Next, operation of the record and reproduction apparatus 10 of this embodiment configured as stated above is explained. The operation of this embodiment is [R-P-r-w] mode, a combination of mode (R) which records stream data on the memory card 20, mode (P) which reproduces the stream data stored in the memory card 20, mode (w) which writes arbitrary data of the memory card 20 into the memory 3, and mode (r) which writes the arbitrary data of the memory 3 into the memory card 20.

About the processing ([P-r] mode) that reads arbitrary data from the memory card 20 while reproducing stream data stored in the same memory card 20, the explanation is similar to that of the flow chart of FIG. 2 in the first preferred embodiment.

Furthermore, about the processing ([P-w] mode) that writes arbitrary data into the memory card 20 while reproducing stream data stored in the same memory card 20, the explanation is similar to that of the flow chart of FIG. 4 in the second preferred embodiment.

Furthermore, about the processing ([R-w] mode) that writes the arbitrary data into the memory card 20 while recording stream data on the same memory card 20, the explanation is similar to that of the flow chart of FIG. 4 in the third preferred embodiment.

Furthermore, about the processing ([R-r] mode) that reads arbitrary data from the memory card 20 while recording stream data on the same memory card 20, the explanation is similar to that of the flow chart of FIG. 2 in the fourth preferred embodiment.

As mentioned above, according to this embodiment, the arbitrary data can be read from the memory card 20, and the arbitrary data further can be written into the same memory card 20. At this time, the capacity of reproduction buffer 5a and recording buffer 5b and the access speeds to the memory card 20 are held down, and the break of the reproducing processing and the record processing is not caused during reproduction of the stream data in the memory card 20 or record of the stream data on the memory card 20 ([R-P-r-w]).

Sixth Preferable Embodiment

Figure 8:
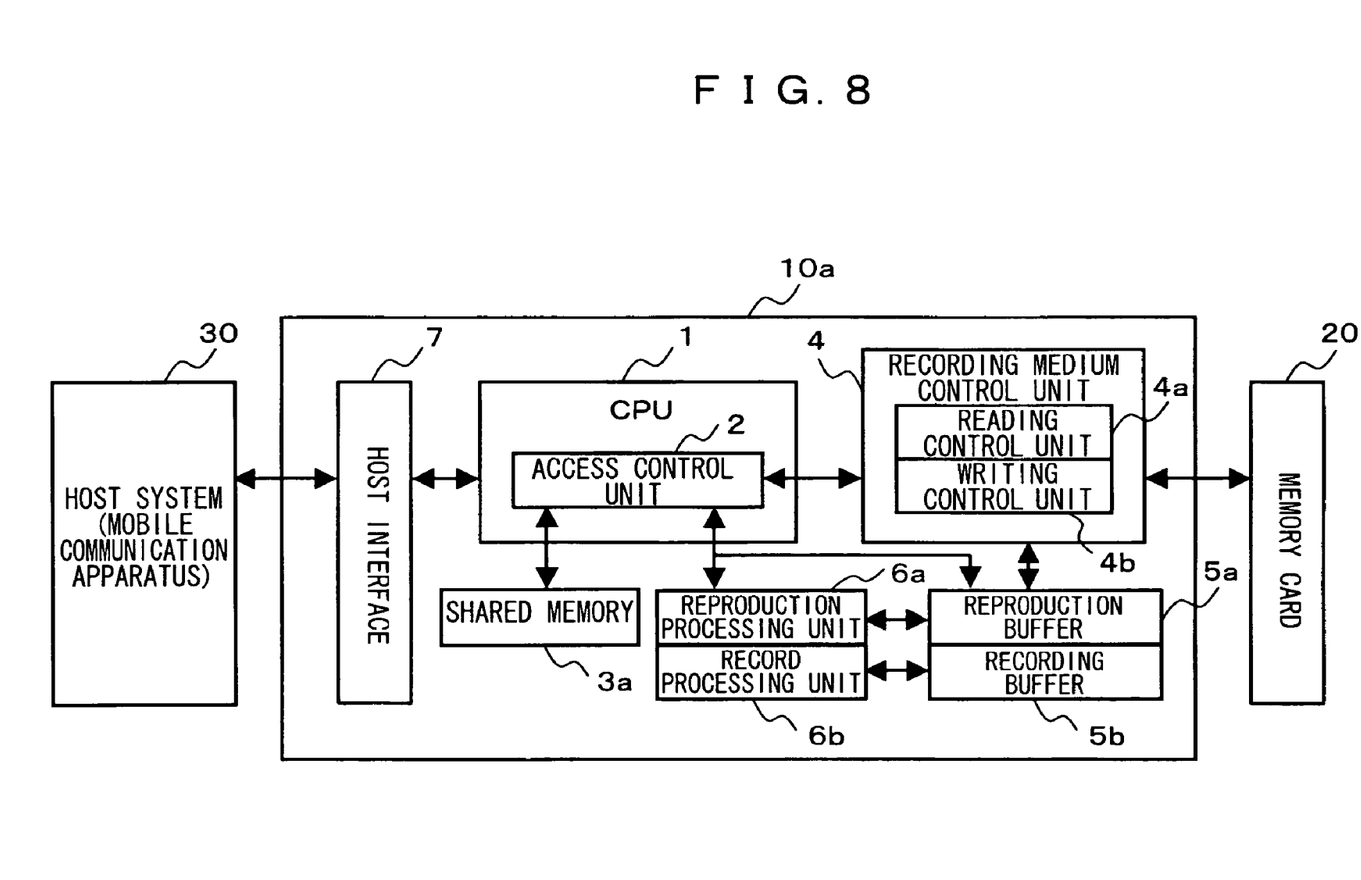
FIG. 8 is a block diagram showing a configuration of a companion system in a sixth preferred embodiment of the present invention.

FIG. 8 is a block diagram showing a configuration of a companion system in the sixth preferred embodiment of the present invention. The companion system includes a host interface 7 to a host system 30 which controls a mobile communication apparatus on the assumption that the configuration of the record and reproduction apparatus 10 of the fifth preferred embodiment shown in FIG. 7 is adopted. The access control unit 2 manages a memory access authority regarding the memory 3 as a shared memory 3a shared by the host system 30 and the companion system 10a. Since other composition is the same as that of FIG. 7, the same reference numeral is given to the same part, and explanation thereof is omitted.

Figure 9:
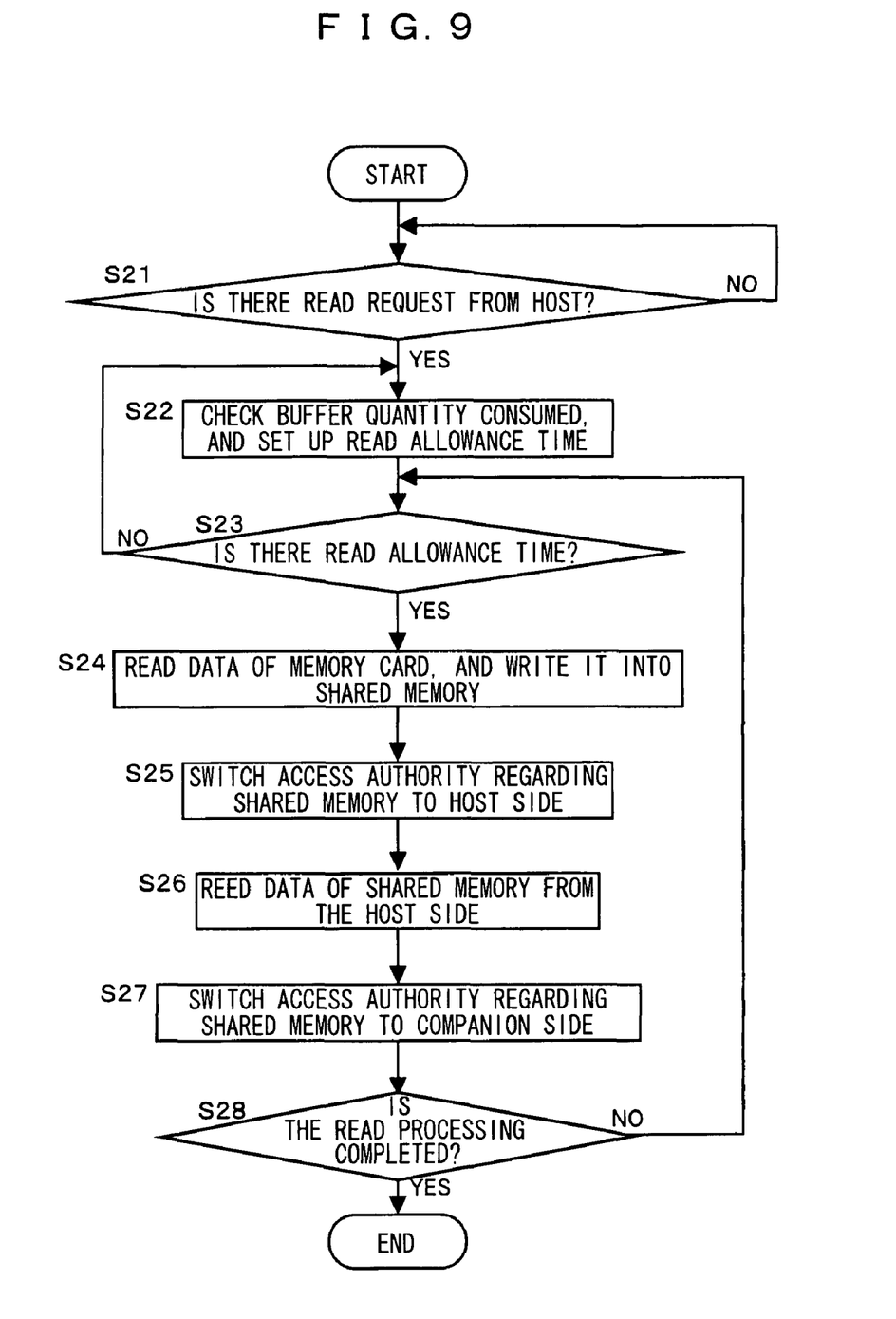
FIG. 9 is a flow chart (No. 1) showing operation of the companion system in the sixth preferred embodiment of the present invention.
Figure 10:
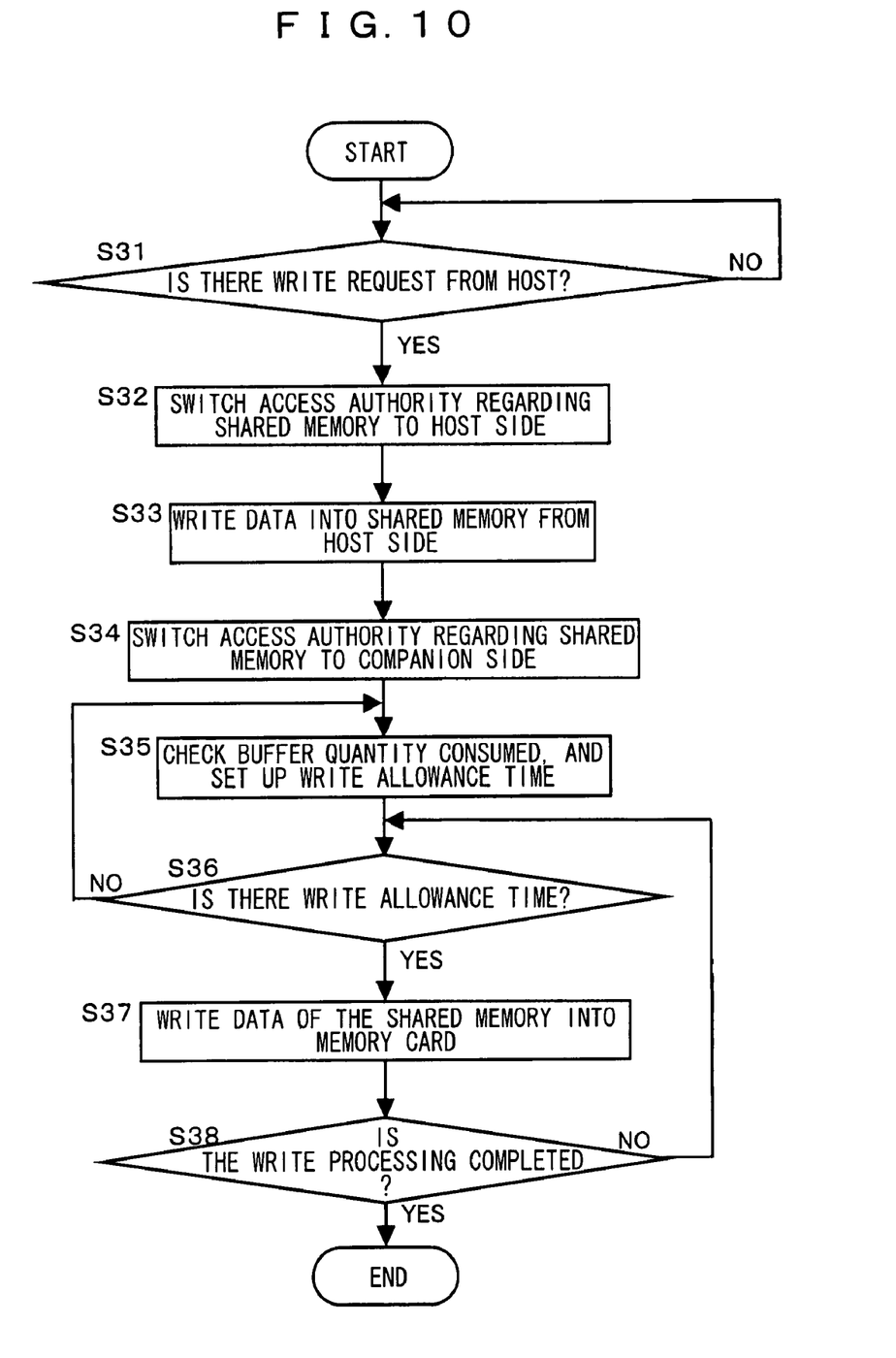
FIG. 10 is a flow chart (No. 10) showing operation of the companion system in the sixth preferred embodiment of the present invention.

Next, operation of the companion system 10a is explained by using flow charts of FIG. 9 and FIG. 10.

FIG. 9 shows processing that reads arbitrary data from the memory card 20 on the host system 30 side while performing the reproduction or recording of the stream data in the same memory card 20 on the companion system 10a side.

When the companion system 10a receives from the host system 30 a request to read data during reproducing or recording the stream (Step S21), the access control unit 2 calculates a read allowance time during which it is guaranteed that the record processing or the reproduction processing does not break off. The read allowance time is calculated on the basis of the usage status of the reproduction buffer 5a or the recording buffer 5b, a read time or a write time between the recording medium control unit 4 and the memory card 20, a required time for storage in the reproduction buffer 5a or the recording buffer 5b, and a decoding time by the reproduction processing unit 6a or the encode time by the record processing unit 6b, etc. (Step S22). Next, the reading control unit 4a in the recording medium control unit 4 reads arbitrary data from the memory card 20 in the set read allowance time, and writes desired data into the shared memory 3a (Step S24).

And then, the access control unit 2 switches the access authority regarding the shared memory 3a from the companion side to the host side (Step S25). The host system 30 reads data stored in the shared memory 3a (Step S26). The access control unit 2 switches the access authority regarding the shared memory 3a from the host side to the companion side (Step S27).

Here, when the read processing is not completed in the read allowance time, the access control unit 2 discontinues the read processing once and sets up the read allowance time again, and this processing is repeated until the read processing is completed (Step S28 and S23).

FIG. 10 shows processing that writes arbitrary data into the memory card 20 from the host system 30 side while performing the reproduction or recording of stream data on the same memory card 20 on the companion system 10a side.

When the companion system 10a receives from the host system 30 a request to write data during reproducing or recording the stream (Step S31), the access control unit 2 switches the access authority regarding the shared memory 3a from the companion side to the host side (step S32). The host system 30 writes the data which is to be written into the memory card 20 into the shared memory 3a (Step S33). The access control unit 2 switches the access authority regarding the shared memory 3a from the host side to the companion side (step S34).

And then, the access control unit 2 calculates a write allowance time during which it is guaranteed that the record processing or the reproduction processing does not break off. The write allowance time is calculated on the basis of the usage status of the reproduction buffer 5a or the recording buffer 5b, a read time or a write time between the recording medium control unit 4 and the memory card 20, a required time for storage in the reproduction buffer 5a or the recording buffer 5b, and a decoding time by the reproduction processing unit 6a or an encode time by the record processing unit 6b, etc. (Step S35). Next, the recording medium control unit 4 writes the data which has been written into the shared memory 3a into the memory card 20 in the set write allowance time (step S37).

Here, when the write processing is not completed in the read allowance time, the access control unit 2 discontinues the write processing once and sets up the write allowance time again, and this processing is repeated until the write processing is completed (Step S38 and S36).

As mentioned above, according to this embodiment, the companion system 10a of a mobile communication apparatus can be easily achieved by using the record and reproduction apparatus 10 of any of the first to fifth preferred embodiments. During reproduction of the stream data recorded on the memory card 20 or recording of the stream data on the memory card 20, arbitrary data can be read from and written into the same memory card 20. Moreover, since it is guaranteed that the read processing or the write processing is performed without the break of the record processing or the reproduction processing, the buffer capacity of the recording buffer 5b and the reproduction buffer 5a can be held down. Furthermore, since no high-speed processing of the memory card 20 is required, a system that enables low power operation can be provided by optimizing the operation frequency.

Seventh Preferable Embodiment

Figure 11:
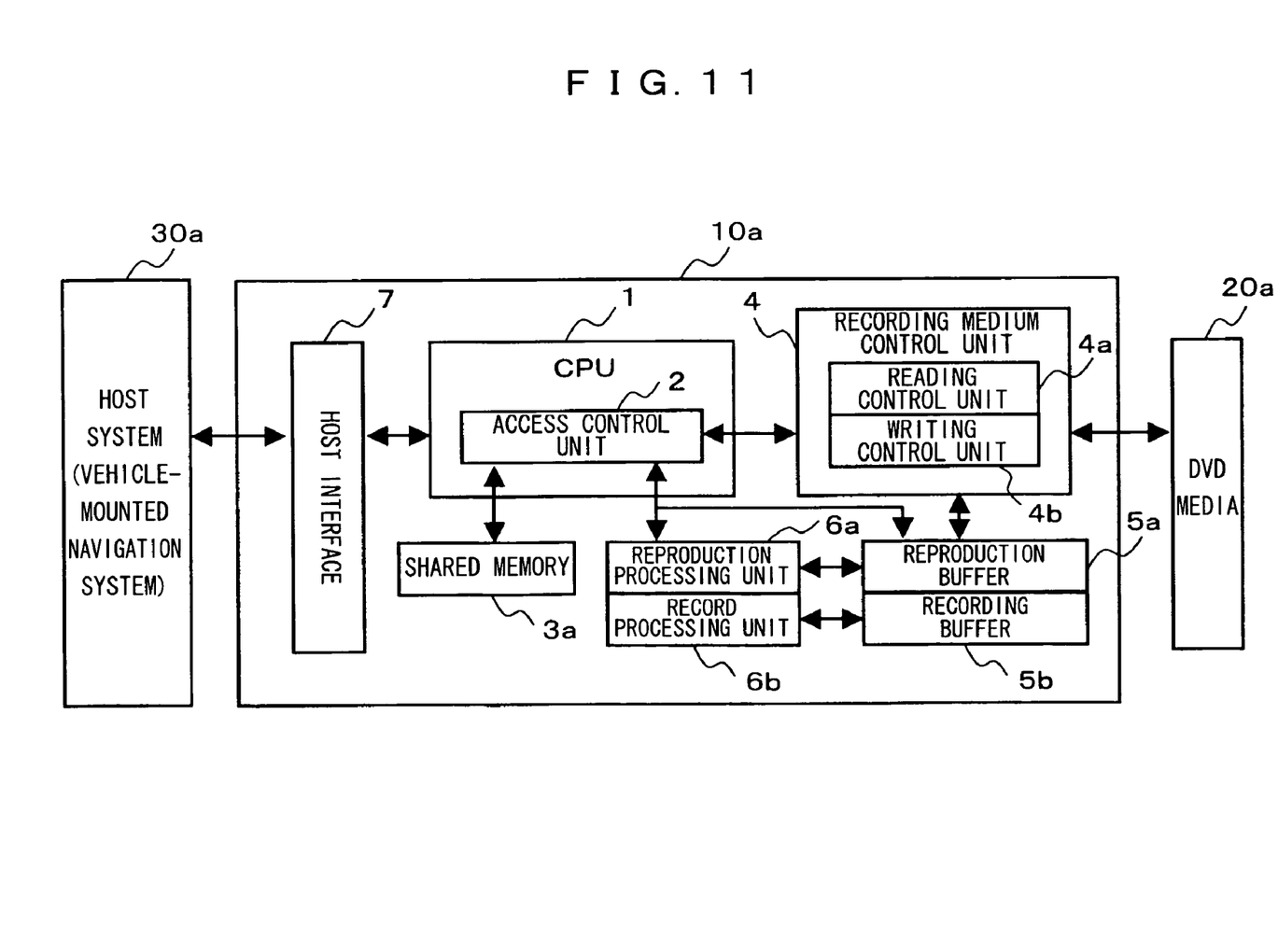
FIG. 11 is a block diagram showing a configuration of a companion system in a seventh preferred embodiment of the present invention.

FIG. 11 is a block diagram showing a configuration of a companion system in a seventh preferred embodiment of the present invention. The host interface 7 to the host system 30a which controls a vehicle-mounted car navigation system is provided on the assumption that the configuration of the companion system 10a of the sixth preferred embodiment shown in FIG. 8 is adopted. Since other composition is the same as that of FIG. 8, the same reference numeral is given to the same part, and explanation thereof is omitted.

Figure 12:
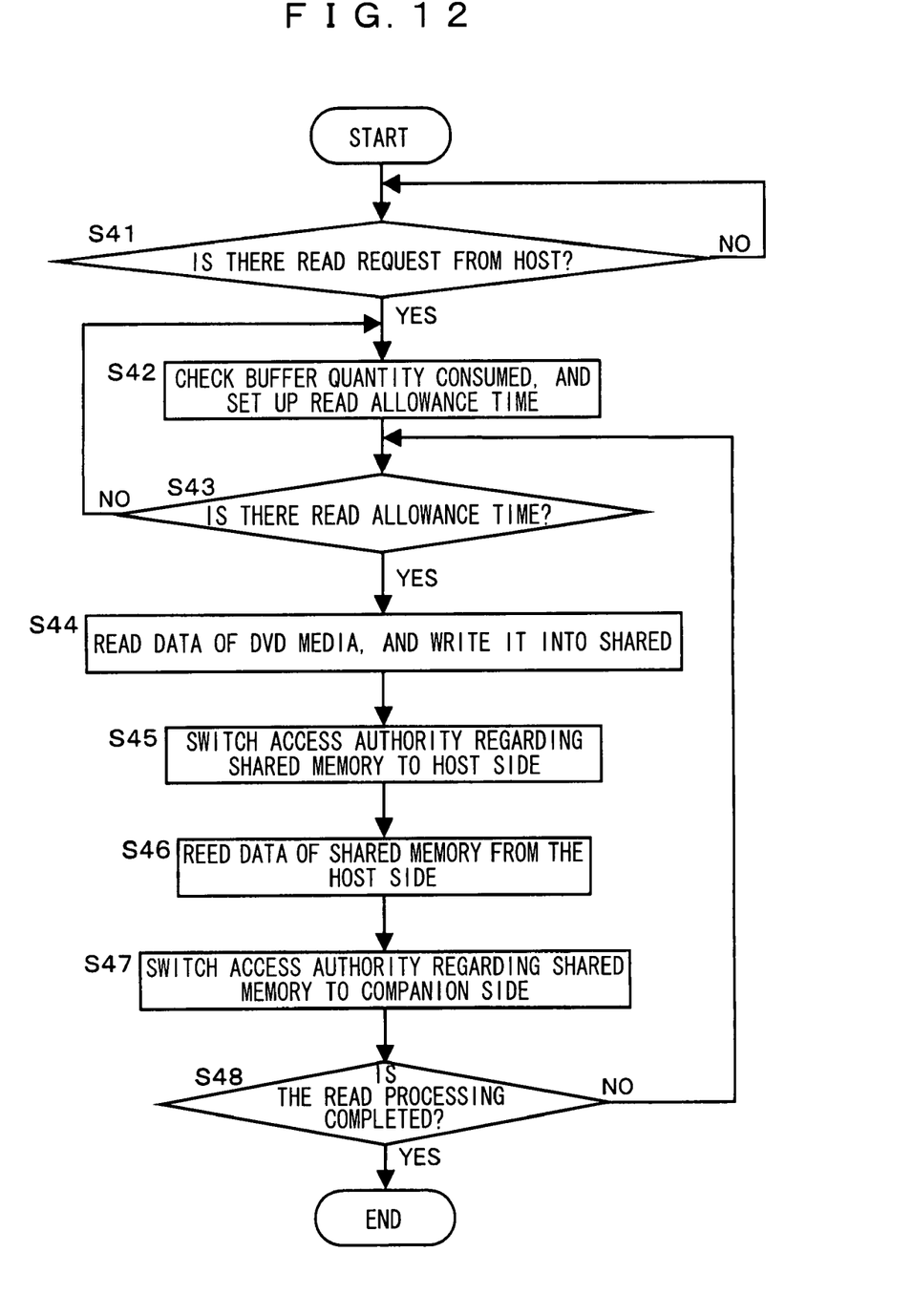
FIG. 12 is a flow chart (No. 1) showing operation of the companion system in the seventh preferred embodiment of the present invention.
Figure 13:
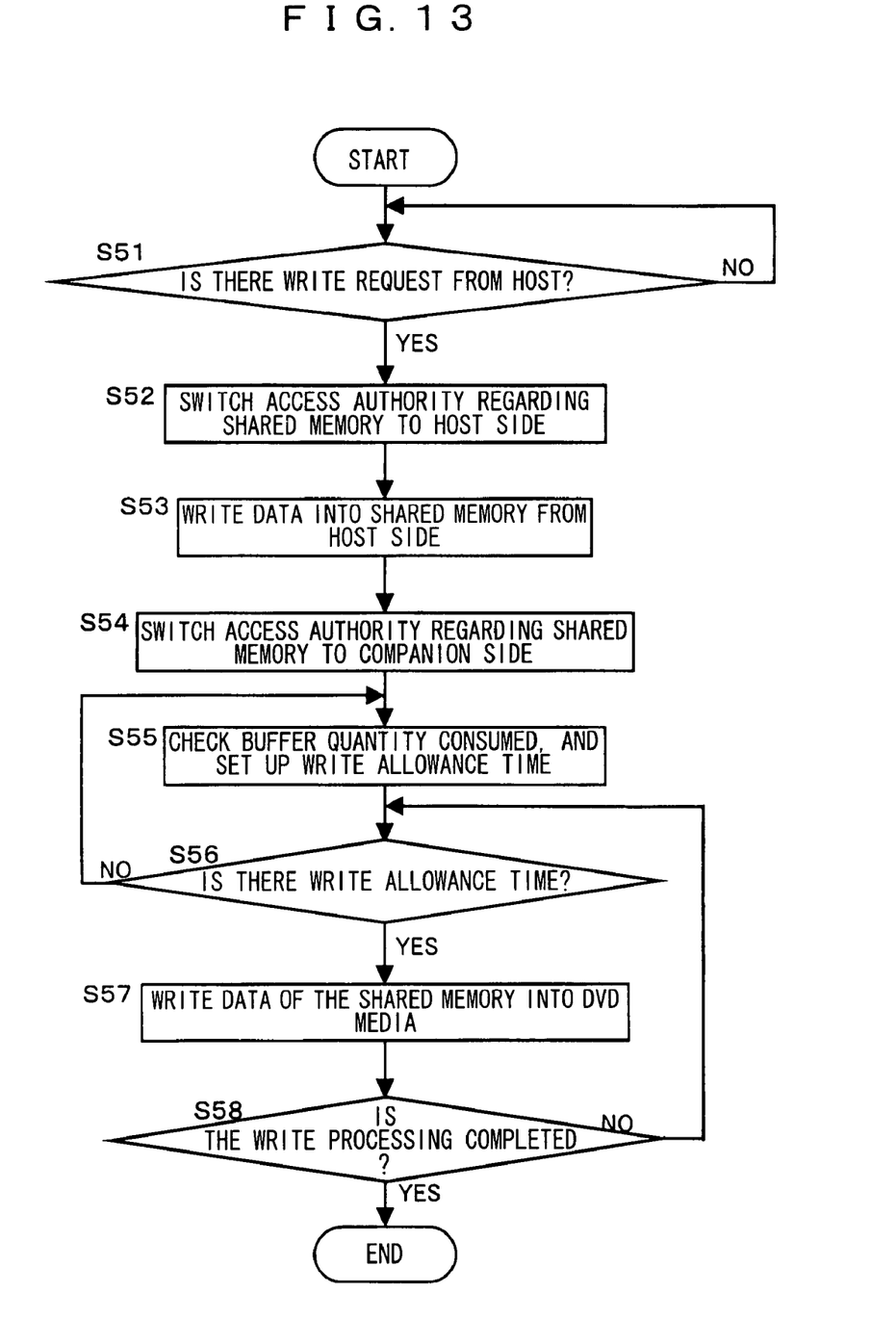
FIG. 13 is a flow chart (No. 2) showing operation of the companion system in the seventh preferred embodiment of the present invention.

Next, operation of the companion system 10a is explained by using flow charts of FIG. 12 and FIG. 13.

FIG. 12 shows processing that reads arbitrary data from a DVD media 20a on the host system 30a side while performing the reproduction or recording of the stream data on the same DVD media 20a on the companion system 10a side.

When the companion system 10a receives from the host system 30a a request to read data during reproducing or recording the stream (Step S41), the access control unit 2 calculates a read allowance time during which it is guaranteed that the record processing or the reproduction processing does not break off. The read allowance time is calculated on the basis of the usage status of the reproduction buffer 5a or the recording buffer 5b, a read time or a write time between the recording medium control unit 4 and the DVD media 20a, a required time for storage in the reproduction buffer 5a or a recording buffer 5b, and the decoding time by the reproduction processing unit 6a or an encode time by the record processing unit 6b, etc. (Step S42). Next, the reading control unit 4a in the recording medium control unit 4 reads arbitrary data from the DVD media 20a in the set read allowance time, and writes desired data in the shared memory 3a (Step S44).

And then, the access control unit 2 switches the access authority regarding the shared memory 3a from the companion side to the host side (Step S45). The host system 30a reads data stored in the shared memory 3a (Step S46). The access control unit 2 switches the access authority regarding the shared memory 3a from the host side to the companion side (Step S47).

Here, when the read processing is not completed in the read allowance time, the access control unit 2 discontinues the read processing once and sets up the read allowance time again, and this processing is repeated until the read processing is completed (Step S48 and S43).

FIG. 13 shows processing that writes arbitrary data into the DVD media 20a on the host system 30 side while performing reproduction or recording of the stream data on the same DVD media 20a on the companion system 10a side.

When the companion system 10a receives from the host system 30a a request to write data during reproducing or recording the stream (Step S51), the access control unit 2 switches regarding access authority for the shared memory 3a from the companion side to the host side (step S52). The host system 30a writes the data which is to be recorded on the DVD media 20a into the shared memory 3a (Step S53). The access control unit 2 switches the access authority regarding the shared memory 3a from the host side to the companion side (step S54).

And then, the access control unit 2 calculates a write allowance time during which it is guaranteed that the record processing or the reproduction processing does not break off. The write allowance time is calculated on the basis of the usage status of the reproduction buffer 5a or the recording buffer 5b, a read time or a write time between the recording medium control unit 4 and the DVD media 20a, a required time for storage in the reproduction buffer 5a or the recording buffer 5b, and a decoding time by the reproducing processing unit 6a or an encode time by the record processing unit 6b, etc. (Step S55). Next, the recording medium control unit 4 writes the data which has been written into the shared memory 3a into the DVD media 20a in the set write allowance time (step S57).

Here, when the write processing is not completed in the write allowance time, the access control unit 2 discontinues the write processing once and sets up the write allowance time again, and this processing is repeated until the write processing is completed (Step S58 and S56).

As mentioned above, according to this embodiment, the companion system 10a of a vehicle-mounted navigation system can be easily achieved by using the record and reproduction apparatus 10 of any of the first to fifth preferred embodiments. And then, during reproduction of the stream data recorded on the DVD media 20a or recording of the stream data on the DVD media 20a, arbitrary data can be read from and written into the same DVD media 20a. Moreover, since it is guaranteed that the read processing or the write processing is performed without the break of the record processing or the reproduction processing, the buffer capacity of the recording buffer 5b and the reproduction buffer 5a can be held down. Furthermore, since no high-speed processing of the DVD media 20a is required, a system that enable low power operation can be provided by optimizing the operation frequency.

In each of the above-mentioned embodiments, each processing (each function) may be achieved through centralized processing by a single apparatus (single system), or through decentralized processing by two or more apparatuses.

Moreover, a single computer or two or more computers may execute the above-mentioned program(?). That is, processing may be performed in either of two ways: centralized processing and decentralized processing.

While the invention has been described and illustrated in detail, it is to be clearly understood that this is intended be way of illustration and example only and is not to be taken by way of limitation, the spirit and scope of this invention being limited only be the terms of the following claims.

What is claimed is:

1. A record and reproduction apparatus comprising:
   a CPU;
   a memory;
   a recording medium control unit configured to read out data from a recording medium;
   a reproduction buffer configured to temporarily store stream data including at least one of image data and audio data out of the data read by the recording medium control unit;
   a reproduction processing unit configured to decode and reproduce the stream data temporarily stored in the reproduction buffer; and
   an access control unit configured to control timing by which the access control unit switches between access to the memory and access to the reproduction buffer under the condition that reproduction of the stream data does not break off during the reproduction of the stream data while supervising the state of the reproduction buffer, and to manage the memory and the recording medium control unit in each transaction, wherein
   the recording medium control unit is further configured to read arbitrary data out of the recording medium based on the timing controlled by the access control unit and to store the read arbitrary data to the memory during the reproduction of the stream data.

2. The record and reproduction apparatus according to claim 1, wherein the recording medium control unit controls a read only medium including a CD-ROM or a DVD-ROM as the recording medium.

3. The record and reproduction apparatus according to claim 1, wherein the recording medium control unit is further configured to record data on the recording medium.

4. The record and reproduction apparatus according to claim 1, wherein the recording medium control unit is further configured to control a flash memory as the recording medium.

5. The record and reproduction apparatus according to claim 1, wherein the access control unit is installed inside the CPU.

6. The record and reproduction apparatus according to claim 1, wherein:
   the access control unit is further configured to calculate a read allowance time during which it is guaranteed that the reproduction processing does not break off, based on at least one of usage status of the reproduction buffer, a reading time from the recording medium to the recording medium control unit, a required time for storing in the reproduction buffer and a decoding time by the reproduction processing unit, and
   the recording medium control unit is further configured to read the arbitrary data within the read allowance time.

7. A companion system comprising the record and reproduction apparatus according to claim 1, and further comprising at least an interface to a host system that controls mobile communication functions, wherein
   the access control unit in the record and reproduction apparatus is configured to manage a memory access authority regarding the memory as a shared memory with the host system.

8. A companion system comprising the record and reproduction apparatus according to claim 1, and further comprising at least an interface to a host system that controls a vehicle-mounted navigation system, wherein
   the access control unit in the record and reproduction apparatus is configured to manage a memory access authority regarding the memory as a shared memory with the host system.

9. A record and reproduction apparatus comprising:
   a CPU;
   a memory;
   a recording medium control unit configured to record data on a recording medium;
   a record processing unit configured to receive and encode a signal including at least one of an image signal and an audio signal, and to output the encoded signal as stream data;
   a recording buffer configured to temporarily store the stream data encoded by the record processing unit; and
   an access control unit configured to control timing by which the access control unit switches between access to the memory and access to the recording buffer under the condition that recording of the stream data does not break off during the recording of the stream data on the recording medium while supervising the state of the recording buffer, and to manage the memory and the recording medium control unit in each transaction, wherein
   the recording medium control unit is further configured to write arbitrary data out of the memory to the recording medium based on the timing controlled by the access control unit during the recording of the stream data.

10. The record and reproduction apparatus according to claim 9, wherein the recording medium control unit is further configured to read out data from the recording medium.

11. The record and reproduction apparatus according to claim 10, further comprising:
- a reproduction buffer configured to temporarily store stream data including at least one of image data and audio data out of the data read by the recording medium control unit; and
- a reproduction processing unit configured to decode and reproduce the stream data temporarily stored in the reproduction buffer.

12. The record and reproduction apparatus according to claim 9, wherein the recording medium control unit is further configured to control a flash memory as the recording medium.

13. The record and reproduction apparatus according to claim 9, wherein the access control unit is installed inside the CPU.

14. The record and reproduction apparatus according to claim 9, wherein:
- the access control unit is further configured to calculate a write allowance time during which it is guaranteed that the record processing does not break off, based on at least one of usage status of the recording buffer a record time from the recording medium control unit to the recording medium, a required time for storage in the recording buffer and an encode time by the record processing unit, and
- the recording medium control unit is further configured to write the arbitrary data within the write allowance time.

15. A companion system comprising the record and reproduction apparatus according to claim 9, and further comprising at least an interface to a host system that controls mobile communication functions, wherein
- the access control unit in the record and reproduction apparatus is configured to manage a memory access authority regarding the memory as a shared memory with the host system.

16. A companion system comprising the record and reproduction apparatus according to claim 9, and further comprising at least an interface to a host system that controls a vehicle-mounted navigation system, wherein
- the access control unit in the record and reproduction apparatus is configured to manage a memory access authority regarding the memory as a shared memory with the host system.

17. A record and reproduction apparatus comprising:
- a CPU;
- a memory;
- a recording medium control unit configured to read out data from a recording medium;
- a reproduction buffer configured to temporarily store stream data including at least one of image data and audio data out of the data read by the recording medium control unit;
- a reproduction processing unit configured to decode and reproduce the stream data temporarily stored in the reproduction buffer; and
- an access control unit configured to control timing by which the access control unit switches between access to the memory and access to the reproduction buffer under the condition that reproduction of the stream data does not break off during the reproduction of the stream data while supervising the state of the reproduction buffer, and to manage the memory and the recording medium control unit in each transaction, wherein
- the recording medium control unit is further configured to write arbitrary data out of the memory to the recording medium based on the timing controlled by the access control unit during the reproduction of the stream data.

18. The record and reproduction apparatus according to claim 17, wherein:
- the access control unit is further configured to calculate a write allowance time during which it is guaranteed that the record processing does not break off, based on at least one of usage status of the reproduction buffer, a reading time from the recording medium to the recording medium control unit, a required time for storing in the reproduction buffer and a decoding time by the reproduction processing unit, and
- the recording medium control unit is further configured to write the arbitrary data within the write allowance time.

19. A record and reproduction apparatus comprising:
- a CPU;
- a memory;
- a recording medium control unit configured to record data on a recording medium;
- a record processing unit configured to receive and encode a signal including at least one of an image signal and an audio signal, and to output the encoded signal as stream data;
- a recording buffer configured to temporarily store the stream data encoded by the record processing unit; and
- an access control unit configured to control timing by which the access control unit switches between access to the memory and access to the recording buffer under the condition that recording of the stream data does not break off during the recording of the stream data on the recording medium while supervising the state of the recording buffer, and to manage the memory and the recording medium control unit in each transaction, wherein
- the recording medium control unit is further configured to read arbitrary data out of the recording medium based on the timing controlled by the access control unit and to store the arbitrary data to the memory during the recording of the stream data.

20. The record and reproduction apparatus according to claim 19, wherein:
- the access control unit is further configured to calculate a read allowance time during which it is guaranteed that the reproduction processing does not break off, based on at least one of usage status of the recording buffer a record time from the recording medium control unit to the recording medium, a required time for storage in the recording buffer and an encode time by the record processing unit, and
- the recording medium control unit is further configured to read the arbitrary data within the read allowance time.

* * * * *